(12) United States Patent
Venneri et al.

(10) Patent No.: US 6,442,226 B1
(45) Date of Patent: Aug. 27, 2002

(54) ACCELERATOR-DRIVEN TRANSMUTATION OF SPENT FUEL ELEMENTS

(75) Inventors: Francesco Venneri; Mark A. Williamson; Ning Li, all of Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 08/869,327

(22) Filed: Jun. 5, 1997

Related U.S. Application Data

(60) Provisional application No. 60/017,837, filed on Jun. 6, 1996.

(51) Int. Cl.[7] .................................................. G21G 1/06
(52) U.S. Cl. ........................ 376/170; 376/189; 376/194
(58) Field of Search ................................ 376/194, 195, 376/311, 158, 170, 189, 359; 423/3, 4; 588/15, 20

(56) References Cited

U.S. PATENT DOCUMENTS

| | | | | |
|---|---|---|---|---|
| 4,721,596 A | * | 1/1988 | Marriott et al. ............. | 376/170 |
| 5,160,696 A | * | 11/1992 | Bowman ..................... | 376/170 |

OTHER PUBLICATIONS

Bowman et al, LA–UR–91–2601, "Nuclear Energy Generation and Waste Transmutation Using an Accelerator–Driven Intense Thermal Neutron Source", pp. 1–26, 1991.*

* cited by examiner

Primary Examiner—Daniel D. Wasil
(74) Attorney, Agent, or Firm—Samuel M. Freund

(57) ABSTRACT

An apparatus and method is described for transmuting higher actinides, plutonium and selected fission products in a liquid-fuel subcritical assembly. Uranium may also be enriched, thereby providing new fuel for use in conventional nuclear power plants. An accelerator provides the additional neutrons required to perform the processes. The size of the accelerator needed to complete fuel cycle closure depends on the neutron efficiency of the supported reactors and on the neutron spectrum of the actinide transmutation apparatus. Treatment of spent fuel from light water reactors (LWRs) using uranium-based fuel will require the largest accelerator power, whereas neutron-efficient high temperature gas reactors (HTGRs) or CANDU reactors will require the smallest accelerator power, especially if thorium is introduced into the newly generated fuel according to the teachings of the present invention. Fast spectrum actinide transmutation apparatus (based on liquid-metal fuel) will take full advantage of the accelerator-produced source neutrons and provide maximum utilization of the actinide-generated fission neutrons. However, near-thermal transmutation apparatus will require lower standing inventories of plutonium and higher actinides. Uranium, presently the largest volume constituent in nuclear waste, is fully utilized and not discharged as waste. Since no plutonium, higher actinides or fission products are present in the reconstituted fuel elements, the present processes can be used repeatedly. Since the performance of the existing reactors is not changed, full utilization of both thorium and uranium resources is achieved.

4 Claims, 16 Drawing Sheets

ACCELERATOR-DRIVEN TRANSMUTATION OF SPENT FUEL ELEMENTS

This application claims the benefit of U.S. Provisional Application No. 60/017,837 filing date Jun. 6, 1996.

This invention was made with government support under Contract No. W-7405-ENG-36 awarded to The Regents of the University of California by the U.S. Department of Energy. The government has certain rights in the invention.

FIELD OF THE INVENTION

The present invention relates generally to processing of spent fuel rods and, more particularly, to accelerator-driven transmutation of spent fuel elements such that actinides and long-lived fission products are transmuted, and electrical power and new fuel are generated.

BACKGROUND OF THE INVENTION

Present nuclear waste strategies, centered about geologic repository storage, require geologic stability and separation of wastes from human contact for tens of thousands of years. Transmutation offers the potential for transforming the time scales associated with such storage to hundreds of years or less.

Transmutation of long-lived nuclear wastes to short-lived or stable isotopes has been studied for many years. A sampling of illustrative techniques is presented in "A Conceptual Study of Actinide Transmutation System With Proton Accelerator: (1) Target Neutronics Calculation," by H. Takada et al., Proceedings Of The $2^{nd}$ International Symposium On Advanced Nuclear Energy Research-Evolution By Accelerators, Jan. 24–26, 1990 Mito, Ibaraki, Japan. Therein, the authors describe a transmutation apparatus using KeV neutrons which requires large material inventories to achieve significant transmutation rates since cross sections for neutron capture are small at these neutron energies. Moreover, the proton beam is admitted to the subcritical reactor target using a window, which limits the neutron flux available for the process. The direct interaction between the proton beam and the sodium coolant will produce substantial quantities of oxygen, carbon, nitrogen, and hydrogen spallation product which may combine to generate tar. Finally, degradation of the cladding material for the nuclear waste as a result of proton bombardment may present a lifetime problem. In "Accelerator Molten-Salt Breeding And Thorium Fuel Cycle," by Kazuo Furukawa et al., Proceedings Of The $2^{nd}$ International Symposium On Advanced Nuclear Energy Research-Evolution By Accelerators, Jan. 24–26, 1990, Mito, Ibaraki, Japan, the authors describe a windowless apparatus accepting high proton beam currents having GeV energies which are caused to impinge directly on the target materials as in Takada et al., supra, except cooled by molten salt. Transmutation is achieved using keV neutrons where the low cross sections of the neutrons require large inventories to achieve useful transmutation throughput. Additionally, since the thorium is mixed with lithium fluoride, proton spallation will again produce bothersome tars.

In "Status Report Of The SIN Neutron Source," by G. Atchison and W. E. Fisher, Proceedings Of International Collaboration On Advanced Neutron Sources (ICANS-VII), Sep. 13–16, 1983, Atomic Energy Of Canada, Limited, Report AECL-8488, the authors disclose a low-power target for low flux neutron production in Pb—Bi from neutron bombardment with subsequent neutron thermalization using heavy water. Heat is removed from the target by thermal convection, and the low power levels also permit the use of a window between the accelerator vacuum and the target. The proton beam strikes the target from below which has advantages for thermal convection cooling.

In "Apparatus For Nuclear Transmutation And Power Production Using An Intense Accelerator-Generated Thermal Neutron Flux," by Charles D. Bowman, U.S. Pat. No. 5,160,696, which issued on Nov. 3, 1992, the teachings of which are hereby incorporated by reference herein, high thermal neutron fluxes generated from the action of a high power proton accelerator on a spallation target allows the efficient burn-up of higher actinide nuclear waste by a two-step process. Additionally, rapid burn-up of fission product waste for nuclides having small thermal neutron cross sections, and the practicality of small material inventories while achieving significant throughput derive from employment of such high fluxes. The apparatus includes an accelerator, a target for neutron production surrounded by a blanket region for transmutation, a turbine for electric power production, and a chemical processing facility.

Accordingly, it is an object of the present invention to efficiently and subcritically transmute plutonium, higher actinides and long-lived fission products in nuclear waste to reduce the threat of proliferation and to minimize waste streams.

Another object of the present invention is to produce newly-enriched uranium for fuel reconstitution for use in base-load, conventional nuclear reactors.

Yet another object of the invention is to efficiently and subcritically transmute plutonium, higher actinides and long-lived fission products in nuclear waste while producing power to offset operational costs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for processing spent fuel from nuclear reactors hereof includes the steps of: dissolving the spent fuel in a molten salt, forming thereby a solution; separating uranium and transition metals from the solution; exposing the solution to an intense flux of thermal neutrons; and separating the transmutation products for storage thereof; whereby plutonium and higher actinides, and fission products are transmuted.

In another aspect of the present invention, in accordance with its objects and purposes, the method for processing spent fuel from nuclear reactors hereof includes the steps of: converting the spent fuel to elemental metals; electrorefining uranium and thorium onto an electrode, thereby removing uranium and thorium from the elemental metals; electrorefining transuranic elements into a molten bismuth cathode, thereby removing transuranic elements from the elemental metals, blending the transuranic elements dissolved in molten bismuth with molten lead, or placing the transuranic elements dissolved in molten bismuth in canisters; exposing the blended solution or the canisters to an intense flux of fast neutrons; and separating the transmutation products for storage thereof, whereby plutonium and higher actinides, and fission products are transmuted.

Three ATW-NCC (Accelerator Transmutation of Wastes-Nuclear Cycle Closure) options are described, one of which will be pursued depending on whether nuclear power is to be eventually phased out (ATW-NCC1), continued at the present level or moderately increased levels (ATW-NCC2), or substantially expanded (ATW-NCC3). Functionally, these options are approximately equivalent to the options of once-through cycling, multiple reprocessing and full-fledged breeding, respectively, envisioned for nuclear power systems using current technology.

The three ATW-NCC options utilize spent fuel generated by any existing and conceivable future types of nuclear reactors. ATW-NCC's front-end processes produce a feed of unseparated actinides suitable for nearly complete subcritical burning in the actinide burn unit which is driven by a large-current linear accelerator (LINAC). Power production to offset operational costs is optional.

In ATW-NCC1, excess neutrons generated by the accelerator and the fission of the higher actinides are used in a blanket/reflector containing long-lived fission products to be transmuted. The separated uranium is collected and sent to permanent storage. ATW-NCC1 requires the smallest LINAC driver. Plutonium and higher actinides are completely eliminated, as well as the most troublesome fission products. Uranium is not processed.

In ATW-NCC2 and 3, because of the deep subcriticality, a large number of neutrons is available to breed new $^{233}$U in a surrounding thorium blanket. This $^{233}$U is used to enrich uranium previously extracted from the spent fuel, and new fuel can be fabricated for use in base-load (power) reactors. ATW-NCC2 supported reactors will use uranium fuel. Reactors supported by ATW-NCC3 systems will use denatured thorium fuel, allowing a better fuel utilization factor at the expense of more complex process chemistry. Plutonium and higher actinides are removed from circulation after being generated in the base-load reactors: they are destroyed in their first (and only) pass through the ATW Actinide Burn apparatus and never recycled. About ⅓ of the uranium and thorium energy content is utilized in ATW-NCC2 (to use it completely would require a three-times larger accelerator or a smaller number of supported base-load reactors). The introduction of thorium in the base-load reactor fuel (ATW-NCC3) will eventually allow full utilization of the uranium and thorium energy resources with minimum accelerator size and a maximum number of supported base-load reactors. Both thermal (based on molten salt fuel) and fast-spectrum (based on liquid lead-bismuth fuel) are possible for the ATW Actinide Burn apparatus, with a significant neutronic advantage being gained for the ATW-NCC2 and -3 systems by the adoption of the very hard spectrum liquid metal ATW burner.

Advantages of the present invention include the elimination of plutonium, higher actinides and selected fission products from the nuclear waste stream. With the implementation of ATW-NCC2 and 3-type systems, efficient (and eventually full) utilization of the existing uranium and thorium energy resources will become possible. Additional advantages include the acceptance of nuclear spent fuel from any existing type of nuclear reactor, the prevention of plutonium accumulation, proliferation and diversion at all levels, full compatibility within the existing nuclear infrastructure of base-load reactors, and reduction of the volume of nuclear waste to be permanently stored (including uranium, and thorium in the ATW-NCC2 and 3 concepts) by a factor of greater than 100.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
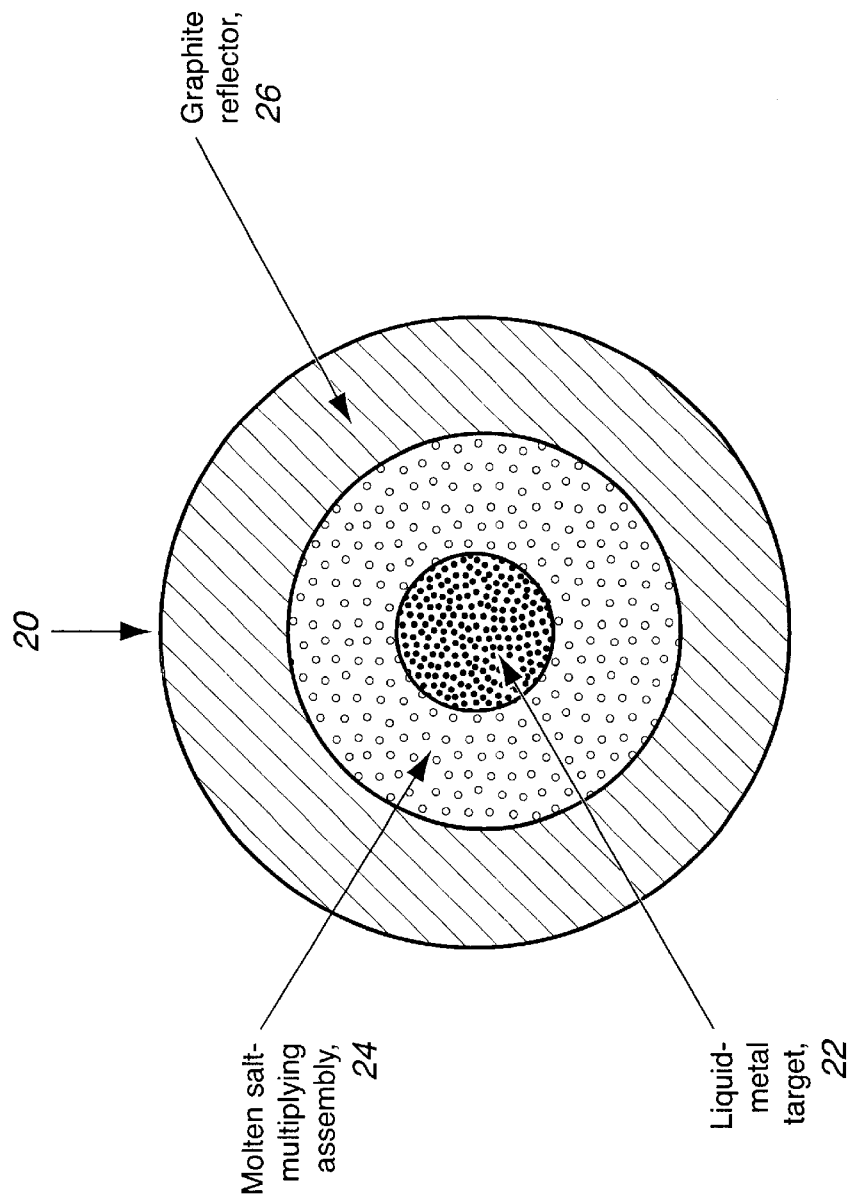
FIG. 1 is a schematic representation of the top view of the cross section of the actinide and fission product transmutation apparatus for the molten salt embodiment of the present invention.

Briefly, ATW-NCC consists of four parts: fuel preparation, actinide transmutation (via the actinide burn apparatus), uranium enrichment (via a blanket of thorium), and fuel reconstitution (the last two parts applying only to ATW-NCC2 and ATW-NCC3):

I. Fuel Preparation

Spent fuel derived from operating nuclear reactors (LWRs, HTGRs, CANDU, and others) is processed using hydrofluorination and electrowinning for the molten salt-based system, and oxide reduction and electrorefining for the lead-based system. The process allows the separation of the enriched uranium and/or thorium contained in the spent fuel without plutonium extraction.

II. Plutonium, higher-actinide and selected fission-product transmutation:

Subsequent to fuel preparation, destruction of plutonium, higher actinides and selected fission products is accomplished using a passively safe, deeply subcritical transmutation apparatus. Two configurations are possible: a graphite-reflected molten salt system, and a fast neutron system based on liquid lead. This fast spectrum configuration does not attempt to moderate neutrons and supplies neutrons for utilization in a uranium enrichment blanket, at the expense of a larger inventory of plutonium and higher actinides in the burn apparatus. Neutrons for sustaining the transmutation process are generated in a liquid metal spallation target driven by a large-current proton accelerator operating in the 1-GeV energy range. No separate target is envisioned for this embodiment. The high-flux transmutation is assisted by the cleanup processes for fission product removal which includes sparging, electrowinning and reductive extraction. The transmutation proceeds to near completion, and only certain fission products are discharged by the process.

III. Uranium Enrichment

In ATW-NCC2 and 3, the actinide transmutation occurs in a deep-subcritical mode ($k_{eff} \ll 1$, where $k_{eff}$ is the reactivity of the system and will be discussed more fully hereinbelow), with a large fraction of neutrons leaking out of the apparatus into a near-zero-power thorium fluoride blanket designed to enrich uranium. The thorium blanket includes molten thorium fluoride in a suitable carrier salt (LiF, $BeF_2$); NaF can be substituted for LiF if tritium production in this unit is a problem. Depending on the current of the accelerator beam, as many as three neutrons per fission occurring in the actinide transmutation apparatus escape from the apparatus and are absorbed in the thorium blanket. A fraction of low-enrichment uranium separated from the spent fuel in the fuel preparation process is introduced into the thorium blanket where it is enriched in the U-233 isotope produced by neutron capture in the thorium. Uranium is subsequently extracted with an enrichment of less than 20%. The extraction does not affect thorium or protactinium in the enrichment blanket. A fission product transmutation loop completes the design of the blanket.

IV. Fuel Reconstitution

In ATW-NCC2 and 3, the enriched uranium stream extracted from the thorium blanket is blended with the bulk of the uranium extracted from the spent fuel in part I above. The resulting uranium (now enriched with a blend of 233 and 235 isotopes up to 4%) is reacted to its oxide form and shipped to the fuel fabrication plant, or processed on-site into metal or oxide fuel elements. Thorium can be similarly reintroduced into the fuel cycle (ATW-NCC3). The newly fabricated fuel elements, produced according to customary fabrication techniques, can be used for refueling the base-load reactors.

The following is a description of the neutronic performance of ATW-NCC systems:

ATW-NCC1 transmutes plutonium and higher actinides coming from spent fuel without recycling or reconstituting the fuel. A typical 3000 MW reactor consumes 1200 kg/yr of fissile material and discharges 300 kg/yr of plutonium and higher actinides suitable for transmutation in the apparatus of the present invention. Therefore, a transmutation reactor which services four reactors by destroying spent fuel plutonium and higher actinides will produce 3000 MW, the same as one of the reactors being serviced. The surplus neutrons generated in the transmutation (by actinide fissions and by the accelerator-driven source) are available to transmute long-lived fission products.

In addition to long-lived fission product transmutation, ATW-NCC2 systems permit reconstitution of the fuel (re-enrichment) for further use in the supported reactors using uranium fuel. These reactors will also discharge 300 kg/yr of plutonium and higher actinides which will have to be transmuted. Additional work is required from the neutrons generated in the transmutation apparatus, as they now have to enrich uranium so to makeup the fissile inventory lost during power generation by the reactors. Uranium-based thermal reactors are well known to have inefficient neutron economy, especially the Light Water Reactors (LWRs), for which about 600 kg/yr of fissile inventory per supported reactor will have to be produced in order for the fuel to be reconstituted to original specifications. Since 300 kg/yr of plutonium and higher actinides are discharged per reactor and destroyed in transmutation apparatus and 600 kg/yr of new fissile material has to be produced in the enrichment blanket per supported reactor, at least 2 neutrons per fission have to be made available in the transmutation apparatus for use in the enrichment blanket, where they will be absorbed in the thorium to produce fissile $^{233}U$.

ATW-NCC3 systems will reconstitute the fuel for use in the supported reactors, producing denatured thorium fuel. The denatured thorium fuel is made of about 80% thorium and 20% uranium, enough to denature the $^{233}U$ produced during the cycle with sufficient amounts of $^{238}U$ so to render the resulting uranium unusable for weapons construction. Far less plutonium and higher actinides are generated in the base-load reactors using the denatured thorium option than using uranium-based fuel. The plutonium produced will then be diluted, nonweapons grade $^{238}Pu$. A typical 3000 MW reactor burning denatured thorium fuel will produce only 100 kg/yr of plutonium and higher actinides for destruction in ATW-NCC3 systems. The denatured thorium cycle also has a more favorable neutron economy, and only 200 kg/yr of fissile material per supported reactor will have to be produced in ATW-NCC3 systems. Since 100 kg/yr of plutonium and higher actinides are discharged per reactor and destroyed in the transmutation apparatus and 200 kg/yr of new fissile material has to be produced in the enrichment blanket per supported reactor, at least 2 neutrons per fission have to be made available to the enrichment blanket, where they will transmute thorium to fissile $^{233}$U.

Thus, for the same thermal power generated in the accelerator-driven actinide transmutation apparatus, three times as many base-load reactors (operating on denatured thorium fuel) can be supported by ATW-NCC3 systems as opposed to ATW-NCC2 systems where the same reactors are operated on uranium-based fuel.

The following is a description of the basic neutronics of subcritical systems:

In ATW-NCC systems, neutrons are used in three ways: destruction of plutonium and higher actinides, transmutation of fission products, and fuel re-enrichment. Neutrons are generated by spallation in the accelerator-driven source and by fission of the fissile species (plutonium and higher actinides). The following basic equation relates source and fission generated neutrons, and governs the behavior of subcritical systems:

$$k_{eff} = n/\{1+A+P+L\},$$

where $k_{eff}$, the reactivity of the system, is related to the system neutron multiplication, M, by the equation:

$$M = 1/\{1-k_{eef}\},$$

n=average number of neutrons released by each fission, P=number of neutrons parasitically absorbed in the system per fission, L=number of neutrons leaving the system (leakage) per fission, and A=ratio of neutron absorption to fission cross section in the active component of the fuel (plutonium and actinides in the case of the present transmutation apparatus). Critical (self-driven) systems have $k_{eff}=1$ and infinite multiplication.

If the transmutation apparatus operated with a fast neutron spectrum (lead-based system, $k_{eff}=0.75$), then the values for the parameters are: A=0.6; P=0.2; n>3, whereas if the apparatus is operated with a more thermal spectrum (molten salt reflected by graphite, $k_{eff}=0.60$), then the values for the parameters are: A=1.4; P=0.4; n<3. Values of n substantially larger than 3 may be possible in fast, deeply subcritical systems, where a substantial number of fissions are initiated by high energy spallation neutrons instead of relatively slow fission neutrons.

Introducing these values to the governing equation, it becomes apparent that more neutrons are available for use (assumed as 80% of leakage neutrons) in the fast-spectrum system than in the more thermal system (for the same value of $k_{eff}$) or, alternately, that higher $k_{eff}$ fast-spectrum systems will generate the same number of usable neutrons as lower $k_{eff}$ slower-spectrum systems with lower multiplications, therefore requiring larger accelerators. On the other hand, inventories in fast-spectrum systems tend to be appreciably larger than those for slower-spectrum systems.

Some of the fission products targeted for transmutation remain in the fuel of the transmutation apparatus and their transmutation is accounted for in the fuel capture parameter P. Some fission products will have to be transmuted outside the burner in additional loops by leakage neutrons. For ATW-NCC1 systems, 0.2 neutrons per fission are needed to effect the transmutation of these long-lived fission products. In a near-thermal spectrum configuration (molten salt reflected by graphite), a subcritical system (driven by the accelerator) operating at a $k_{eff}=0.95$ will free an additional neutron to allow 0.2 leakage neutrons per fission to be used for fission product transmutation. A fast-spectrum system will have sufficient neutrons available even in a critical configuration (without accelerator) to perform the required transmutations of fission products. Unfortunately, a critical system cannot be constructed to operate on pure plutonium and higher actinides, especially in the fast-spectrum configuration. Therefore, some degree of subcriticality (accelerator drive) must be used also in fast-spectrum systems, its extent being determined by safety considerations more than neutron economy factors.

In the case of ATW-NCC2, 2.2 neutrons per fission are required to produce the desired transmutations and to re-enrich the uranium fuel for further use in the base-load reactors. Because of the larger number of reactors which can be supported, ATW-NCC3 units require 2.6 neutrons per fission to perform the same function. If no transmutation of the long-lived fission products is desired, both systems will require two usable leakage neutrons per fission.

Fast-spectrum systems (the lead-based configuration) can contribute at least one usable neutron from internal fissions to the blanket, the remainder must be provided by an accelerator-driven source. For slower-spectrum systems (the molten-salt based configuration), essentially all the usable leakage neutrons are derived from the accelerator-driven source. Therefore, the source strength (accelerator size) will be considerably larger in the ATW-NCC2 and ATW-NCC3 systems based on slower-spectrum configurations.

The following describes the process chemistry of the ATW-NCC system:

A. Molten Salt System

Reference will now be made in detail to the present preferred embodiments of the invention, examples of which are illustrated in the accompanying drawings. Identical callouts are used to describe similar or identical structure or process steps.

Figure 2:
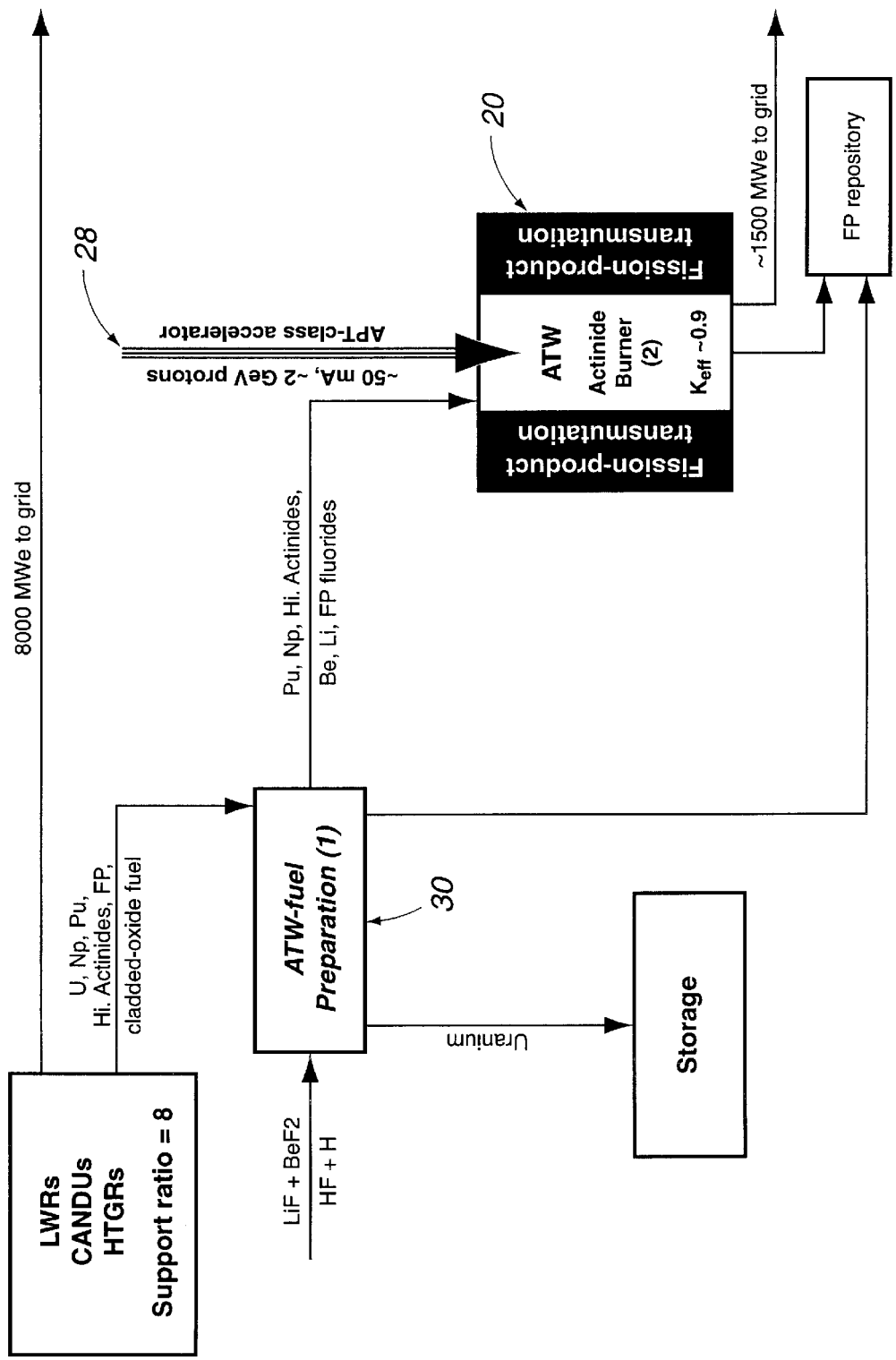
FIG. 2 is a schematic representation of the relationship among the process steps for the preparation of feed material and transmutation thereof, and storage of the resulting materials in accordance with the method of the present invention for the molten salt/nuclear power generation phase-out embodiment thereof.
Figure 3:
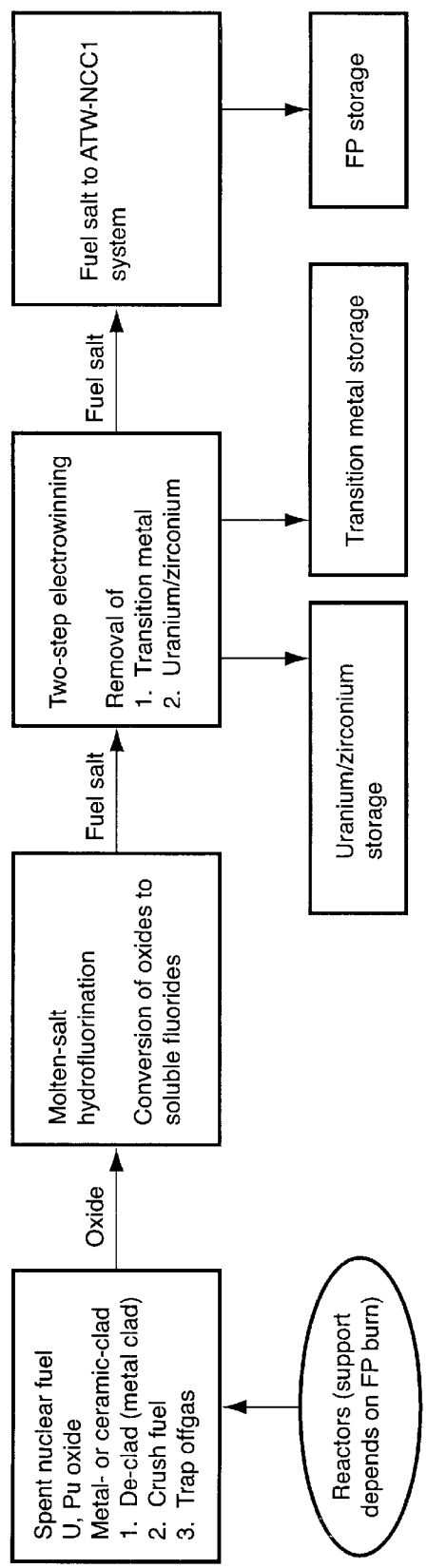
FIG. 3 is an expanded schematic illustration of the details of the fuel preparation step shown in FIG. 2 hereof.
Figure 4:
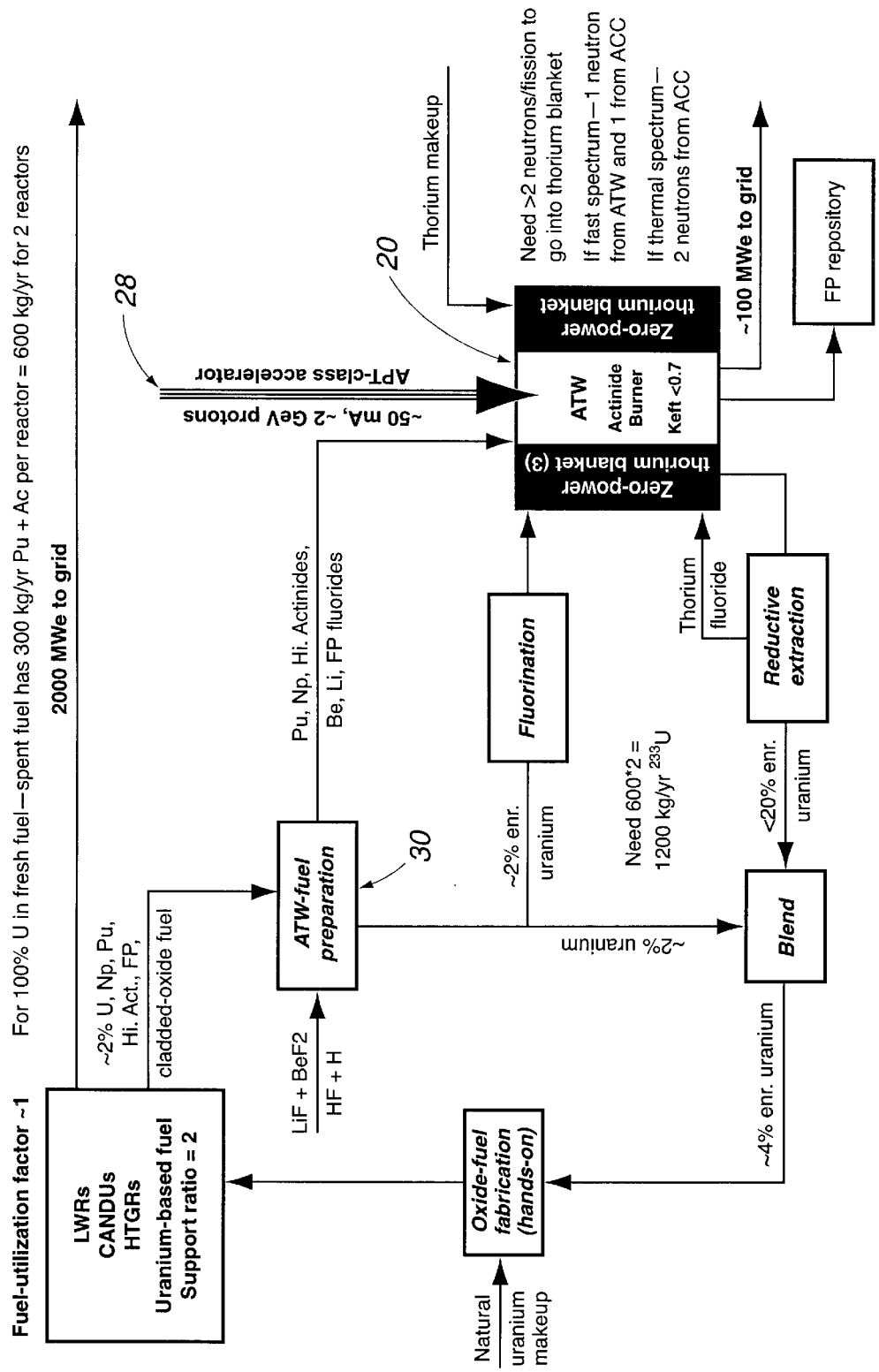
FIG. 4 is a schematic representation of the relationship among the process steps for the preparation of feed material and transmutation thereof, storage of the resulting materials, and preparation of new reactor fuel in accordance with the method of the present invention for the molten salt/continued use of nuclear power generation embodiment thereof.
Figure 5:
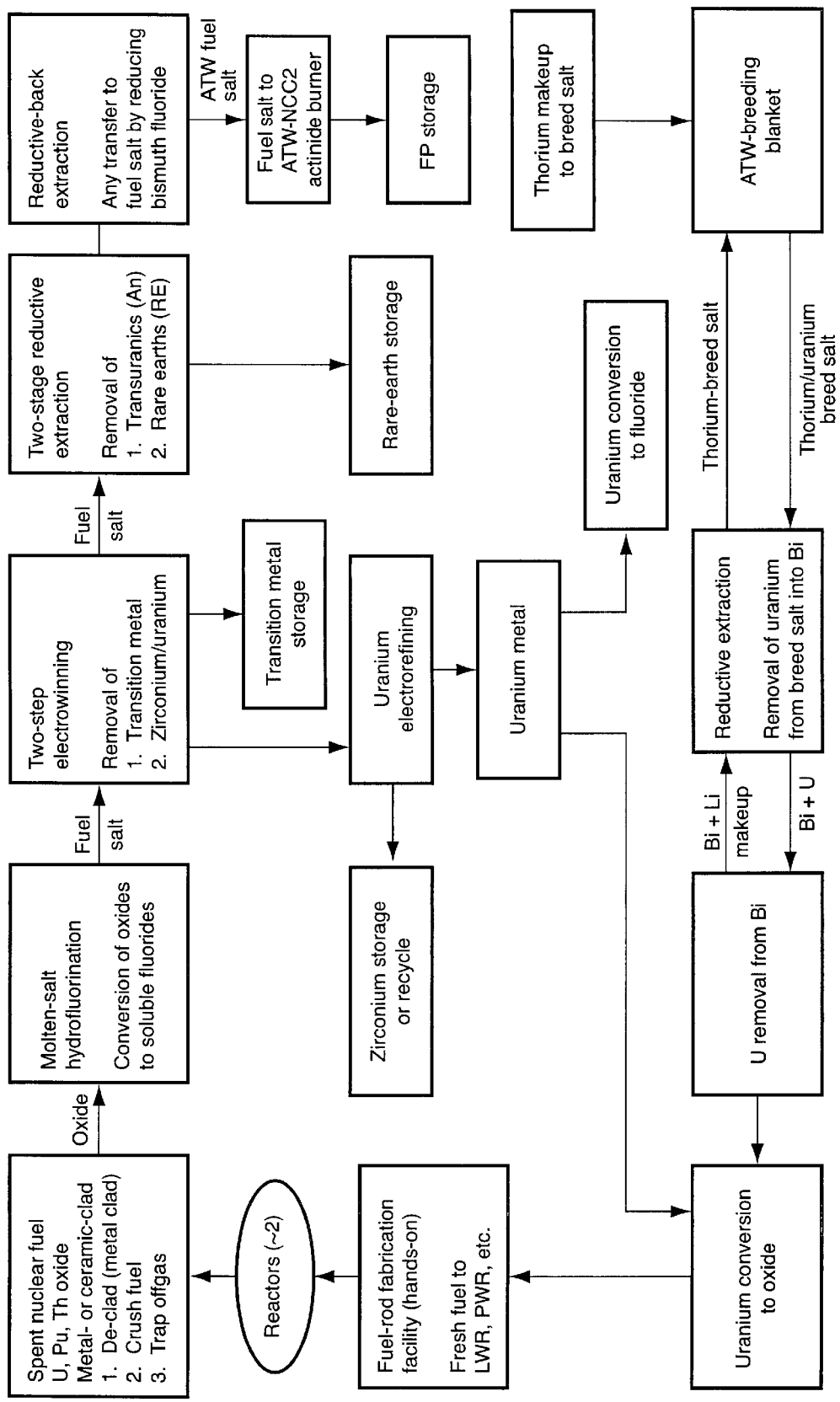
FIG. 5 is an expanded schematic illustration of the fuel preparation step shown in FIG. 4 hereof.
Figure 6:
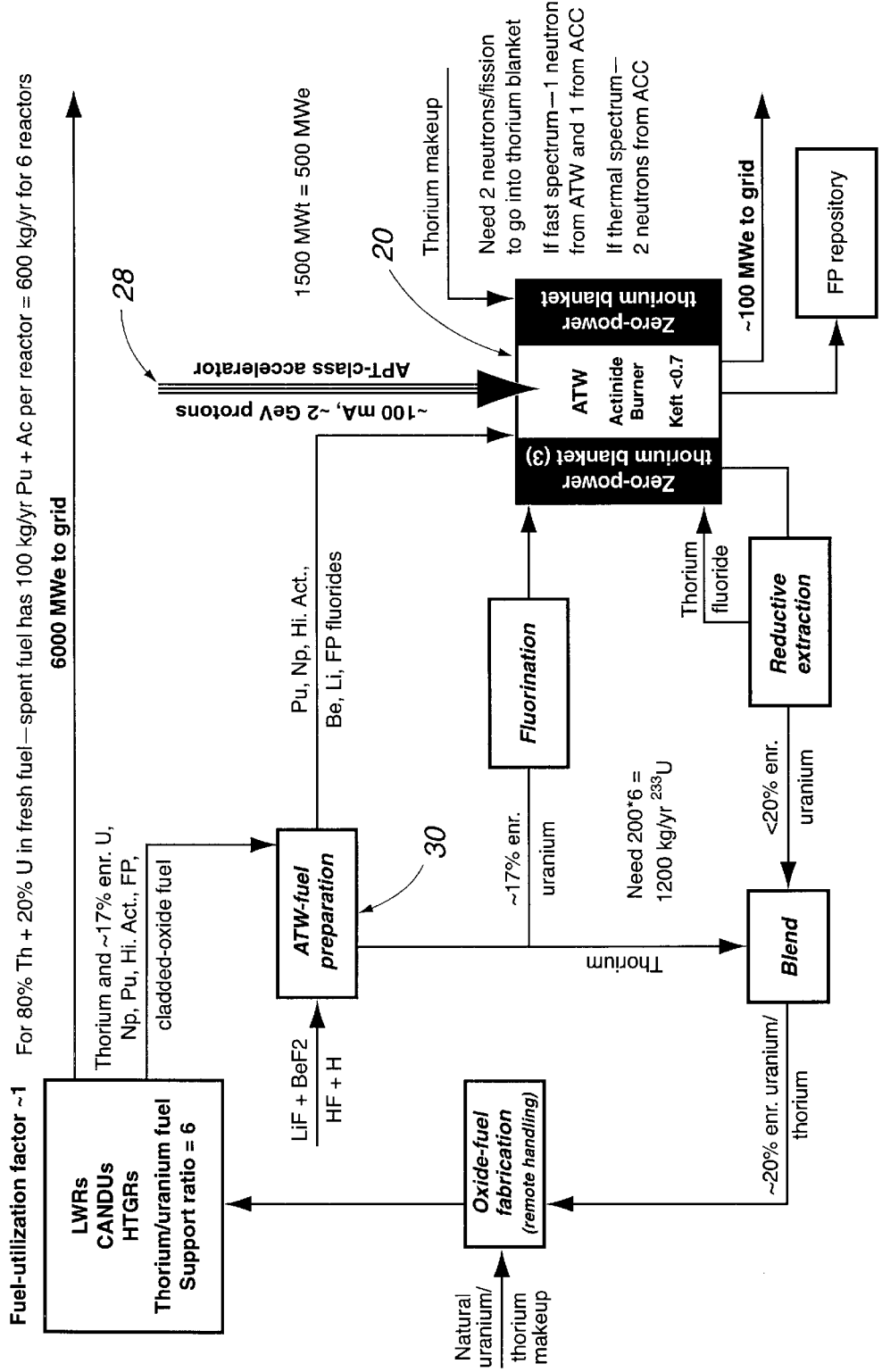
FIG. 6 is a schematic representation of the relationship among the process steps for the preparation of feed material and transmutation thereof, storage of the resulting materials, and preparation of new reactor fuel in accordance with the method of the present invention for the molten salt/expanded use of nuclear power generation embodiment thereof.
Figure 7:
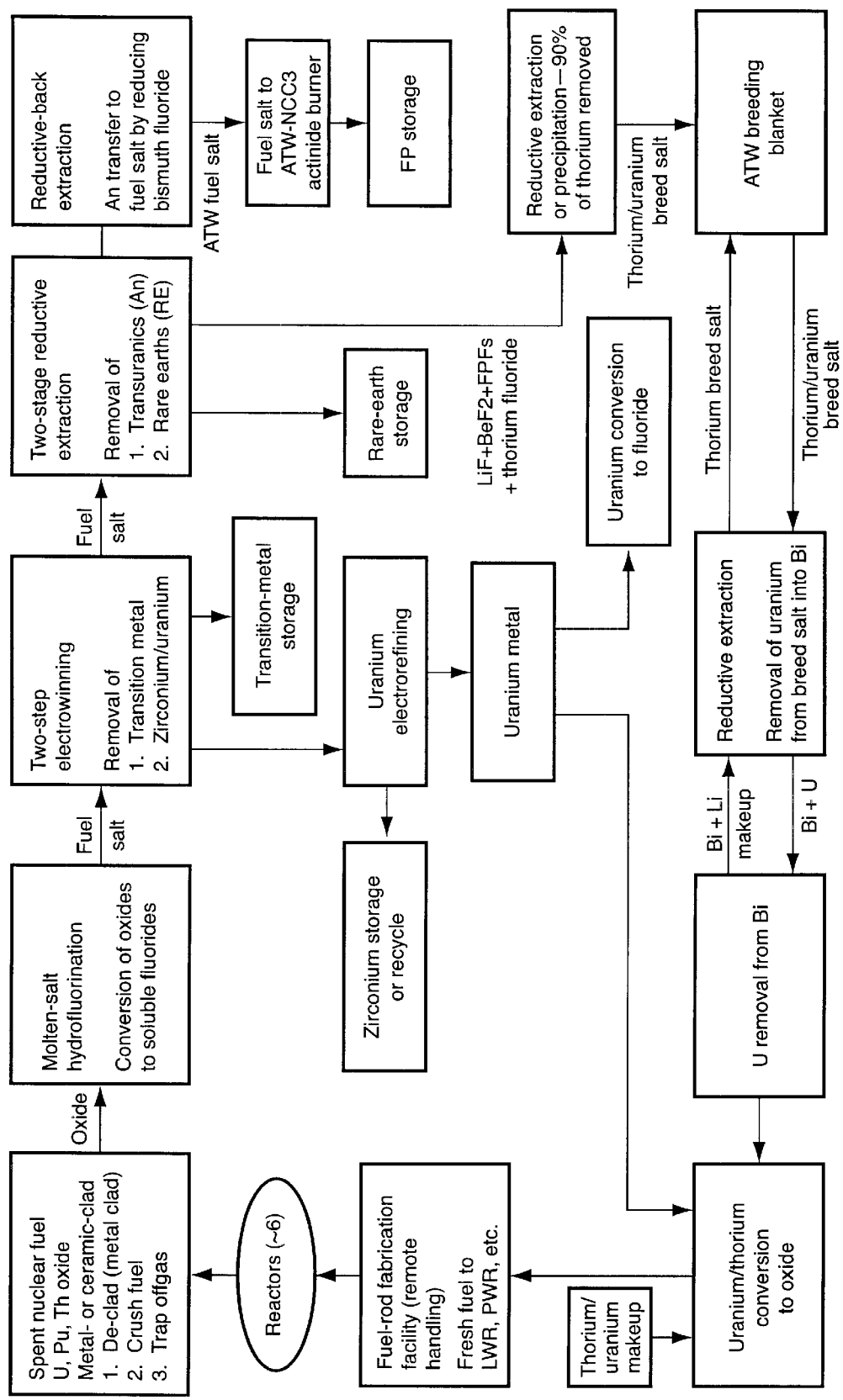
FIG. 7 is an expanded schematic illustration of the fuel preparation step shown in FIG. 6 hereof.
Figure 8:
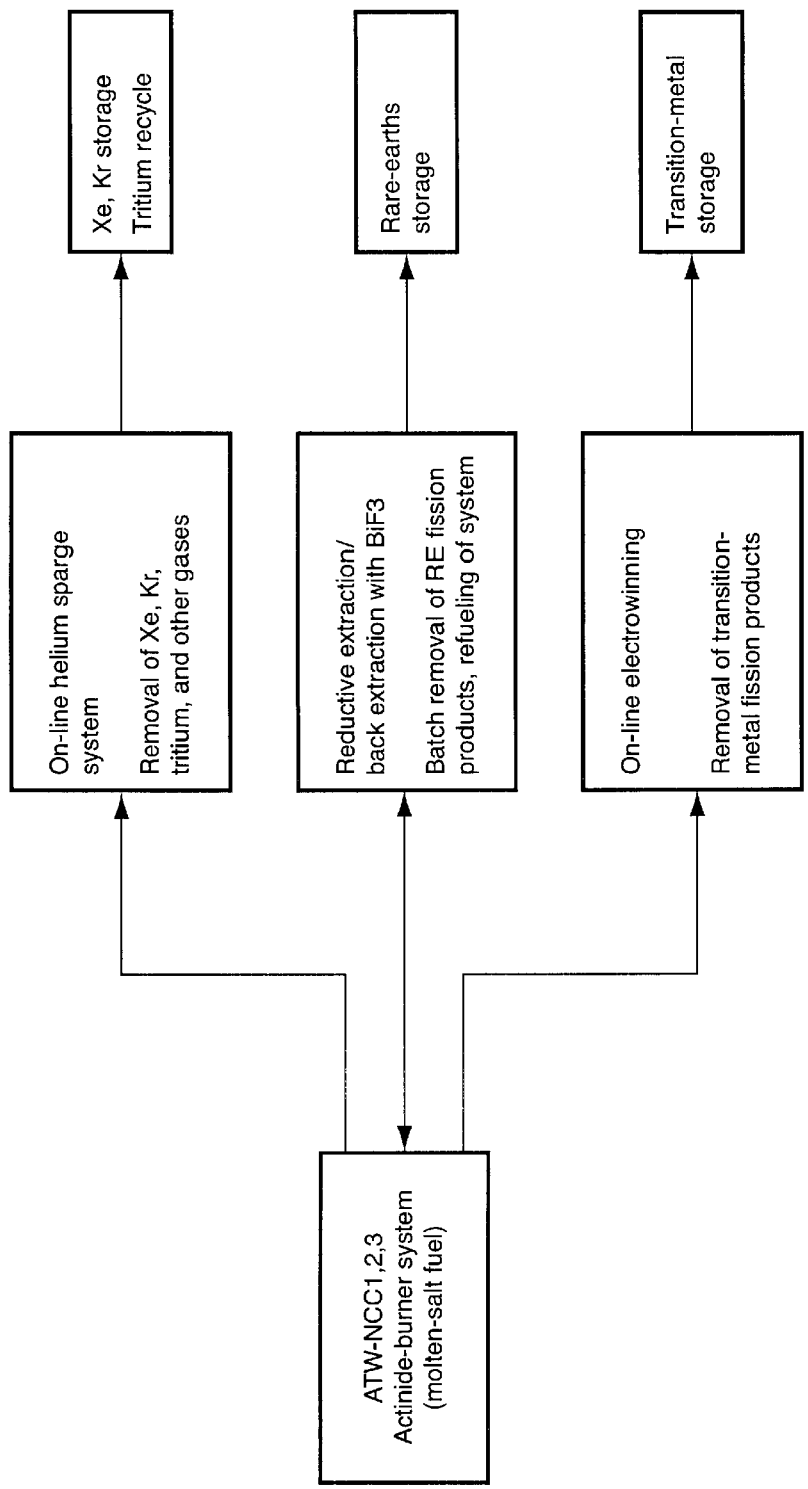
FIG. 8 is a schematic representation of steps for separation of the product materials resulting from transmutation of fission products according to the teachings of the present invention as illustrated in FIGS. 2, 4 and 6 hereof prior to storage.

FIG. 1 is a schematic representation of the top view of the cross section of the actinide and fission product transmutation apparatus, 20, for the molten salt, thermal neutron spectrum embodiment of the present invention. A liquid metal target, for example, lead or lead/bismuth, 22, is surround by a molten salt multiplying assembly, 24, and a graphite reflector, 26. FIG. 2 is a schematic representation of the steps for accomplishing the goals of the ATW-NCC1, molten salt, thermal neutron spectrum option of the present invention, where actinides and fission products are destroyed, but there is no fuel recycling. Liquid metal target 20 is exposed to a high current density of protons, 28. FIG. 3 is an expanded schematic representation of the fuel preparation step, 30, of FIG. 2. FIG. 4 is a schematic representation of the steps for accomplishing the goals of the ATW-NCC2 molten salt, thermal neutron spectrum option of the present invention, where actinides are destroyed and uranium fuel is recycled, while FIG. 5 is an expanded schematic representation of the fuel preparation step, 30, of FIG. 4. FIG. 6 is a schematic representation of the steps for accomplishing the goals of the ATW-NCC3 molten salt, thermal neutron spectrum option of the present invention, where actinides are destroyed and thorium/uranium fuel is recycled, while FIG. 7 is an expanded schematic representation of the fuel preparation step, 30, of FIG. 6. FIG. 8 is a schematic representation of the fission product removal steps from the molten salt located in the actinide burner portion, 24, of the actinide and fission product transmutation apparatus, 20, for the ATW-NCC thermal neutron spectrum options 1, 2, and 3.

Having generally described the molten salt embodiment of the present invention, the following expands upon some of the principal processing steps. The three principal chemical processes associated with the ATW-NCC molten-salt fuel cycle are: molten salt hydrofluorination, electrowinning and reductive extraction.

1. Molten Salt Hydrofluorination

Spent nuclear fuel consists of plutonium oxide, uranium oxide, fission product oxides, gaseous fission products trapped in the oxide matrix, and likely Zircalloy cladding material. Some fission products, uranium, and zirconium are undesirable constituents of the feed for the ATW-NCC where no further production of plutonium from $^{238}$U is desired. The preparation of transmuted fuel from spent nuclear fuel is accomplished as follows. After the fuel has had sufficient time to cool, the fuel pins are chopped by conventional means. Alternatively, the fuel might be decladded and only the oxide fuel chopped. The fission product gas released during the chopping is adsorbed on activated charcoal or molecular sieves. The chopped fuel is fed into a nickel or nickel-alloy chemical reactor that contains 0.67 LiF/0.33 BeF$_2$ molten salt at 1000 K.

Next, the chopped fuel is hydrofluorinated in the presence of excess hydrogen, by bubbling HF into the molten salt at 1000 K. Excess hydrogen is required to prevent the formation of high oxidation state metal fluoride species, for example UF$_4$, PuF$_4$, MoF$_6$. The equations that describe these processes are:

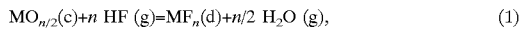
$$MO_{n/2}(c) + n\ HF\ (g) = MF_n(d) + n/2\ H_2O\ (g), \quad (1)$$

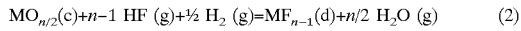
$$MO_{n/2}(c) + n-1\ HF\ (g) + \tfrac{1}{2}\ H_2\ (g) = MF_{n-1}(d) + n/2\ H_2O\ (g) \quad (2)$$

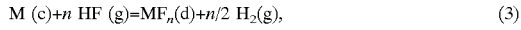
$$M\ (c) + n\ HF\ (g) = MF_n(d) + n/2\ H_2(g), \quad (3)$$

where MO$_{n/2}$ is a metal oxide of metal valence n, M is cladding metal, and MF$_n$ or MF$_{n-1}$ (d) is the metal fluoride dissolved in the LiF/BeF$_2$. The reactions are spontaneous; for example, the free energy change for the conversion of plutonium dioxide to plutonium trifluoride with HF is 125 kJ/mol. The resulting fluoride mixture is then transferred to the electrochemical cell.

2. Electrowinning

Electrochemical processes are used to separate the metals and the uranium dissolved as fluorides in the molten salt. The electrochemical cell consists of a consumable anode, either zirconium or beryllium, and a nickel cathode onto which the metals are deposited.

The electrowinning process is completed in two steps. First, a zirconium anode is used to deposit transition metals on the cathode and in the second step, a beryllium anode is used to deposit uranium and zirconium on the cathode. The equations that describe these processes are:

$$n\ Zr\ (s) + 4\ MF_n(d) = n\ ZrF_4(d) + 4\ M\ (s) \quad (4)$$

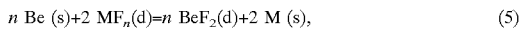
$$n\ Be\ (s) + 2\ MF_n(d) = n\ BeF_2(d) + 2\ M\ (s), \quad (5)$$

where MF$_n$(d) is a metal fluoride dissolved in molten LiF/BeF$_2$. The reactions are spontaneous because of the free energy difference between metal fluorides. For example, consider the removal of 5 mol % of uranium present as uranium tetrafluoride from a 0.28 BeF$_2$/0.67 LiF/0.05 UF$_4$ molten salt. The free energy change for Reaction (5) is −109 kJ/mol. Therefore, in principle, the cell could be operated in a passive fashion (i.e., no external voltage source required). However, the efficiency of the cell is enhanced by applying an externally generated voltage. Thorium, plutonium, higher actinides, lanthanides, strontium, cesium and iodine remain in the molten salt.

One of the features of the LiF/BeF$_2$ molten salt is automatic plutonium proliferation resistance. Plutonium cannot be isolated in this system because of the beryllium electromotive force (emf); that is, its oxidation potential falls below the plutonium emf. This means that all the beryllium must be removed from the system before any of the plutonium could be isolated by electrochemical methods.

3. Reductive Extraction

The process for separating the transuranic elements from the rare earth elements is a liquid-metal extraction process. The process includes contacting the molten salt, which contains the rare earths and transuranics, with a liquid bismuth stream containing a small quantity of lithium (0.1–1 atom % Li). The equation that describes this process is

$$n\ Li\ (I,\ in\ Bi) + MF_n(d) = M\ (I,\ in\ Bi) + n\ LiF\ (d), \quad (6)$$

where MF$_n$ is a transuranic or rare earth fluoride of valence n dissolved in the molten salt and M is the metal dissolved in bismuth. The process works equally well for the separation of uranium from the LiF/BeF$_2$/ThF$_4$ molten salt in the breeding blanket.

As an example, consider the separation of the transuranic and rare-earth elements. This process is proposed for producing a feed stream free of thorium fluoride for the actinide transmutation apparatus, and also for cleansing the transmutation apparatus fuel salt of the lanthanide fission products. The proposed process is a two-stage reduction process in liquid metal followed by a back extraction into the fluoride salt. In the first step, the lithium concentration (0.10 atom % Li) in the bismuth is selected so that the transuranics are preferentially extracted from the molten salt into the liquid bismuth phase where they remain in solution. The transuranics are preferentially extracted from the molten salt into the bismuth because they form thermodynamically less stable fluorides than the rare earths, the difference between free energies of formation of the species being approximately 170 kJ/mol. A different lithium concentration (1.0 atom % Li) is selected for use in the second step, so that the rare earths are removed from the salt and transferred into a second bismuth phase where they remain in solution.

After rare-earth removal, the transuranics are back extracted from the liquid bismuth into the salt by contacting the bismuth stream from the first reduction step with a molten salt stream (LiF/BeF$_2$) which includes BiF$_3$. Bismuth fluoride has adequate solubility in the molten salt, but is thermodynamically less stable than the transuranic trifluorides and will oxidize the transuranics in the Bi stream and transfer them to the salt stream. The rare earths left in the second bismuth stream can be removed by decreasing the temperature of the bismuth and collecting the solids that are formed, oxidizing and blending the solids with silica, and stabilizing the waste material in an appropriate matrix. The bismuth from each stream would be recycled.

B. Liquid Metal System

Figure 9:
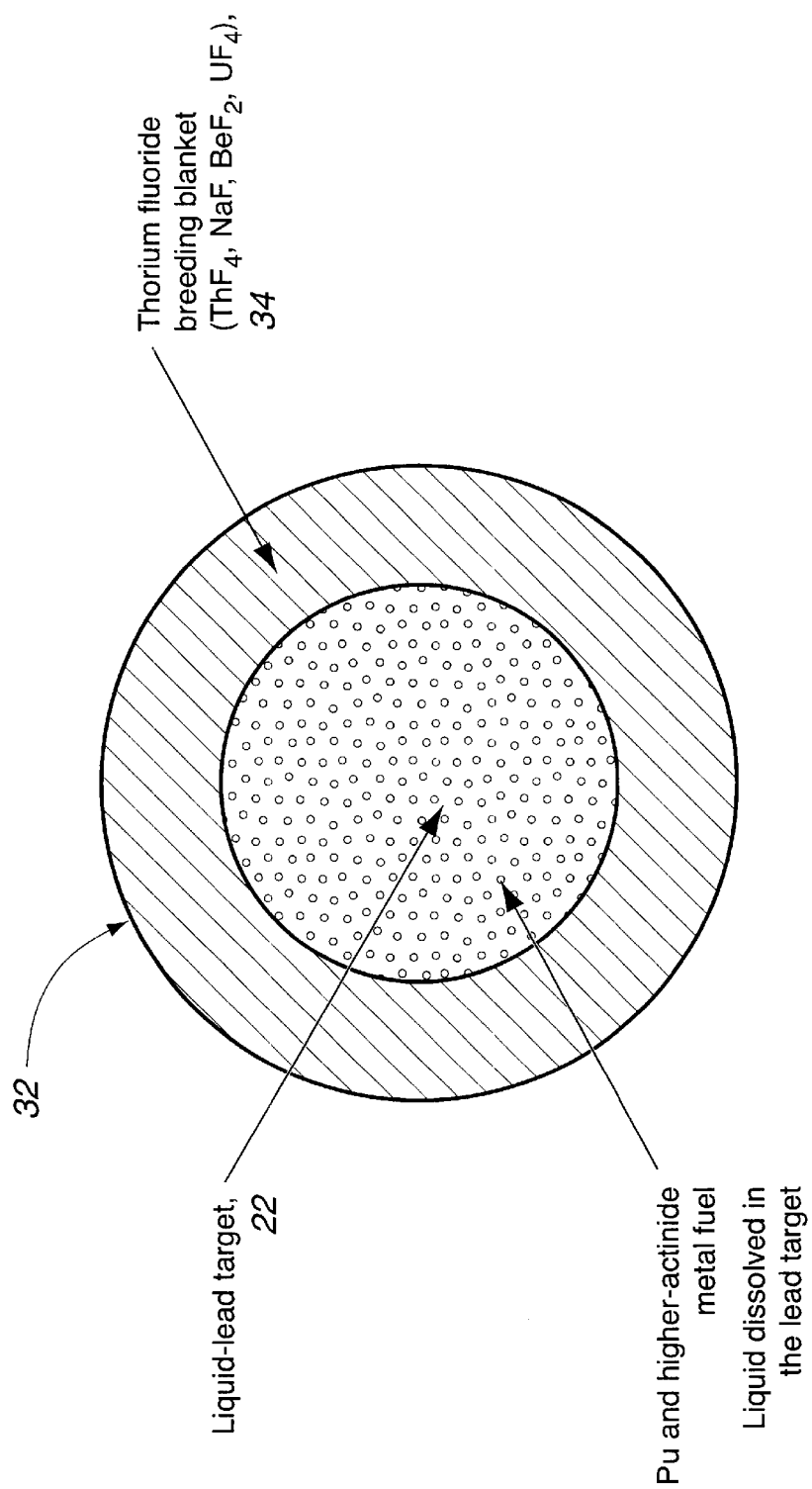
FIG. 9 is a schematic representation of the top view of the cross section of the actinide and fission product transmutation apparatus for the liquid metal embodiment of the present invention.
Figure 10:
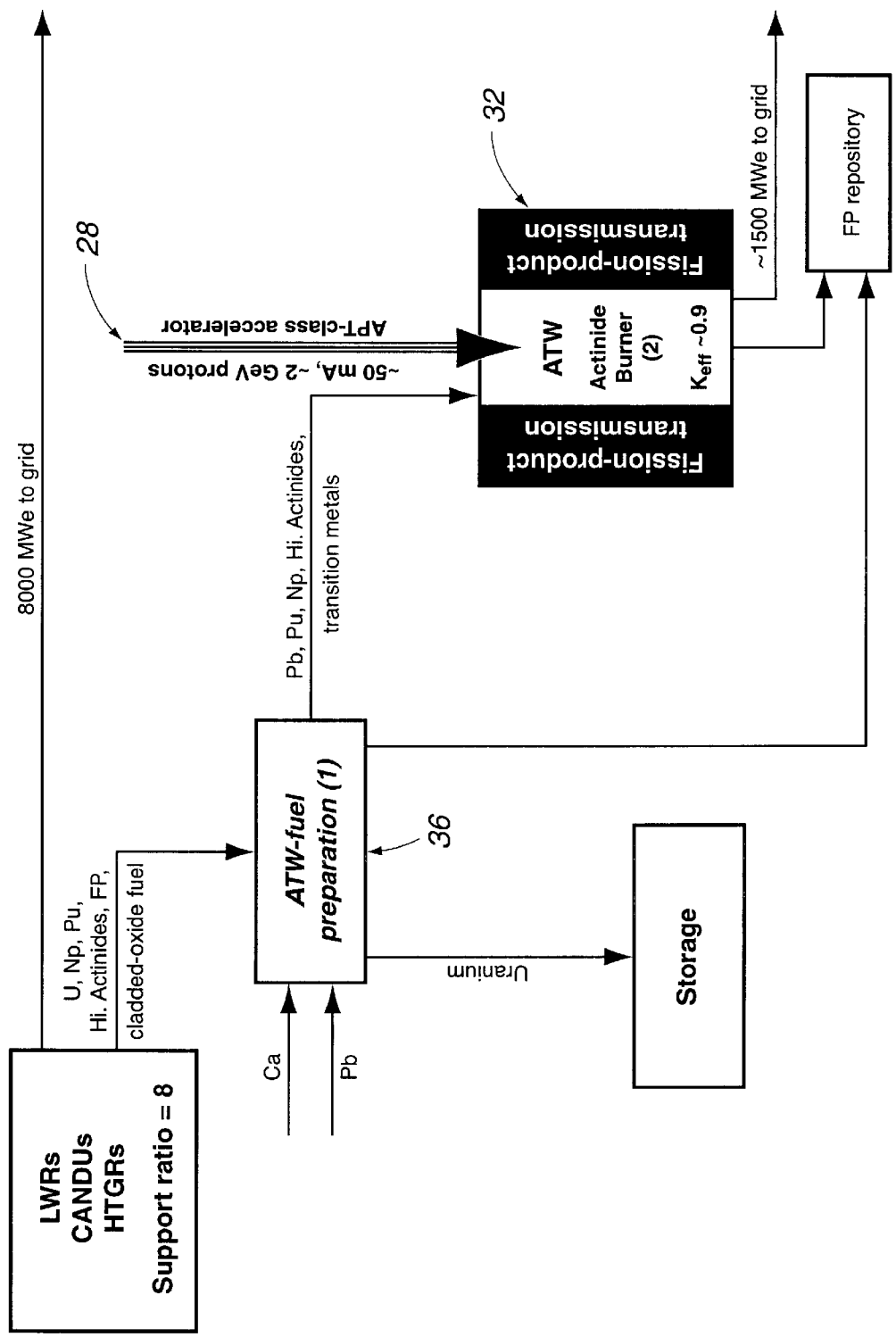
FIG. 10 is a schematic representation of the relationship among the process steps for the preparation of feed material and transmutation thereof, and storage of the resulting materials in accordance with the method of the present invention for the liquid metal/nuclear power generation phase-out embodiment thereof.
Figure 11:
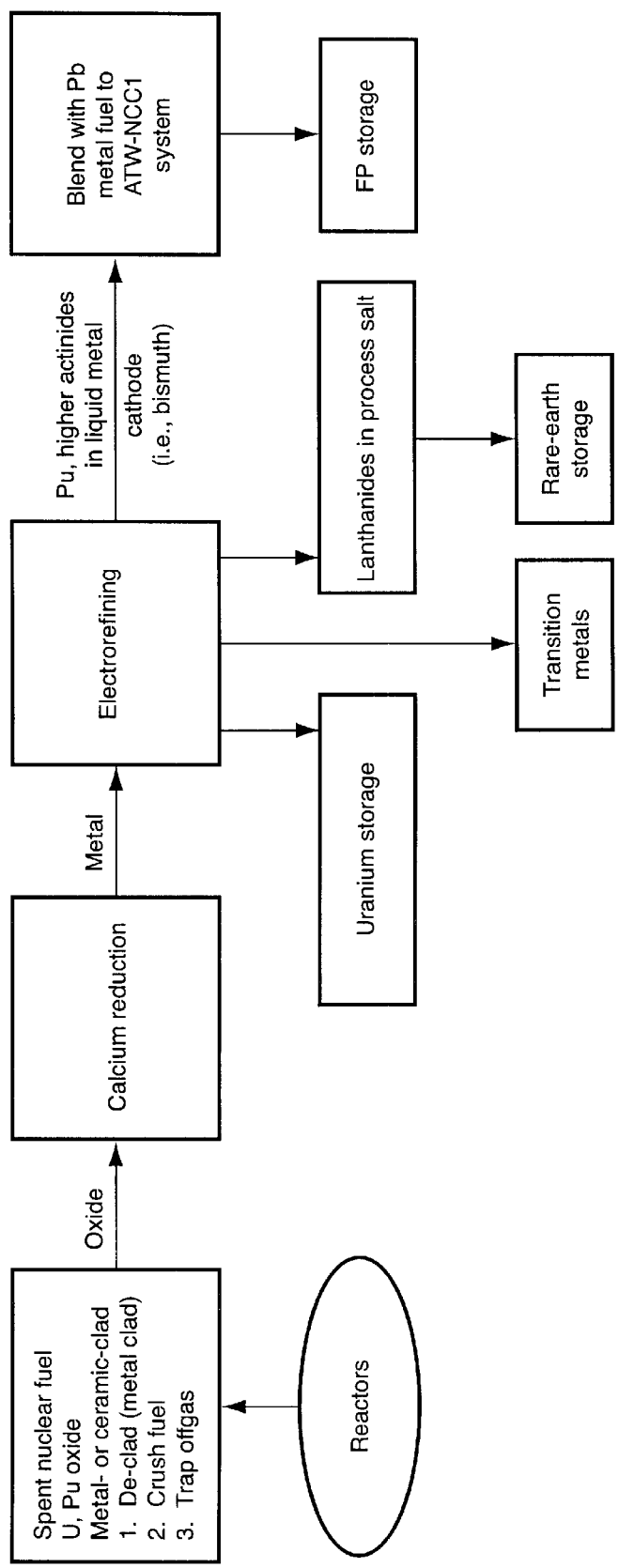
FIG. 11 is an expanded schematic illustration of the details of the fuel preparation step shown in FIG. 10 hereof.
Figure 12:
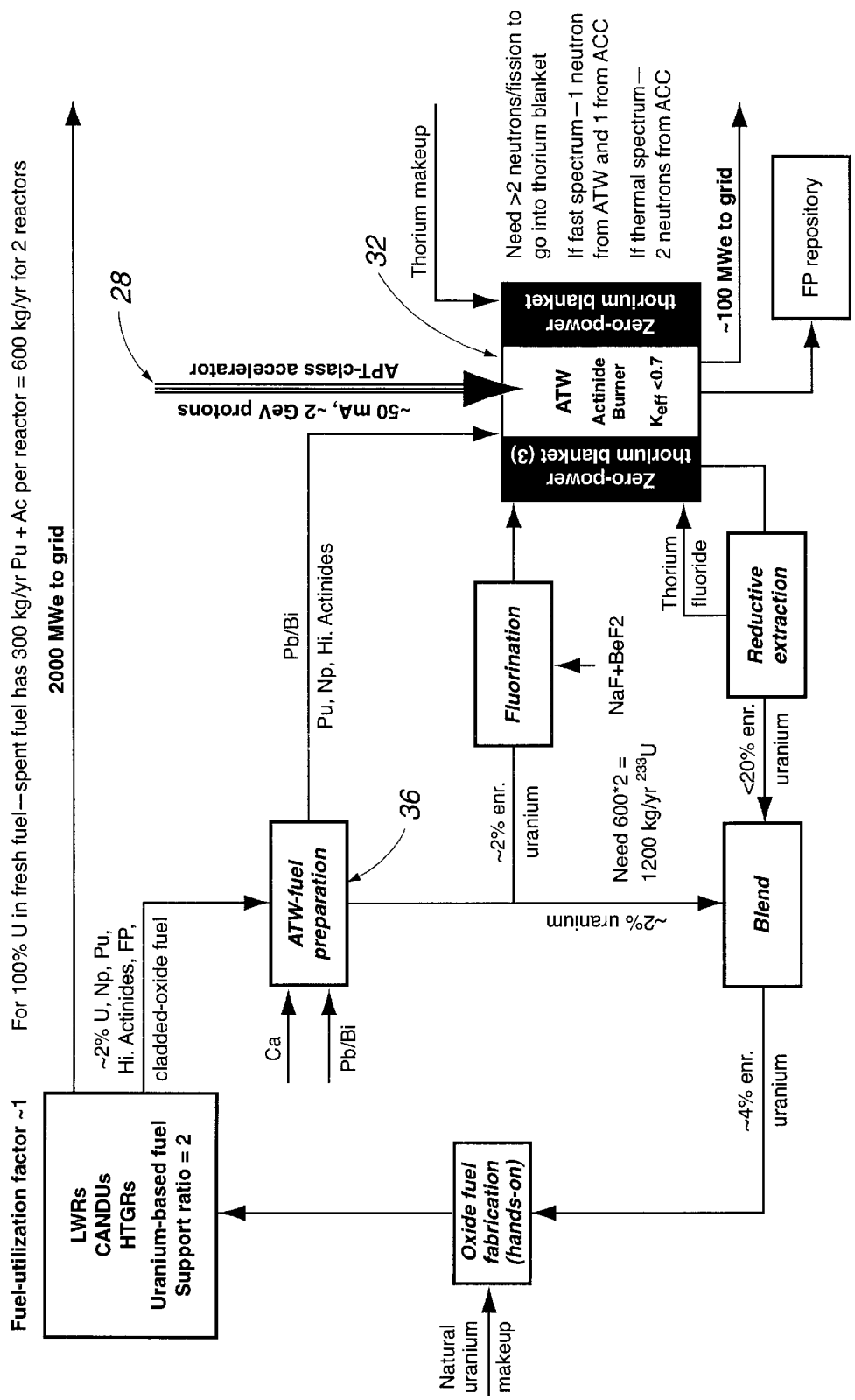
FIG. 12 is a schematic representation of the relationship among the process steps for the preparation of feed material and transmutation thereof, storage of the resulting materials, and preparation of new reactor fuel in accordance with the method of the present invention for the liquid metal/continued use of nuclear power generation embodiment thereof.
Figure 13:
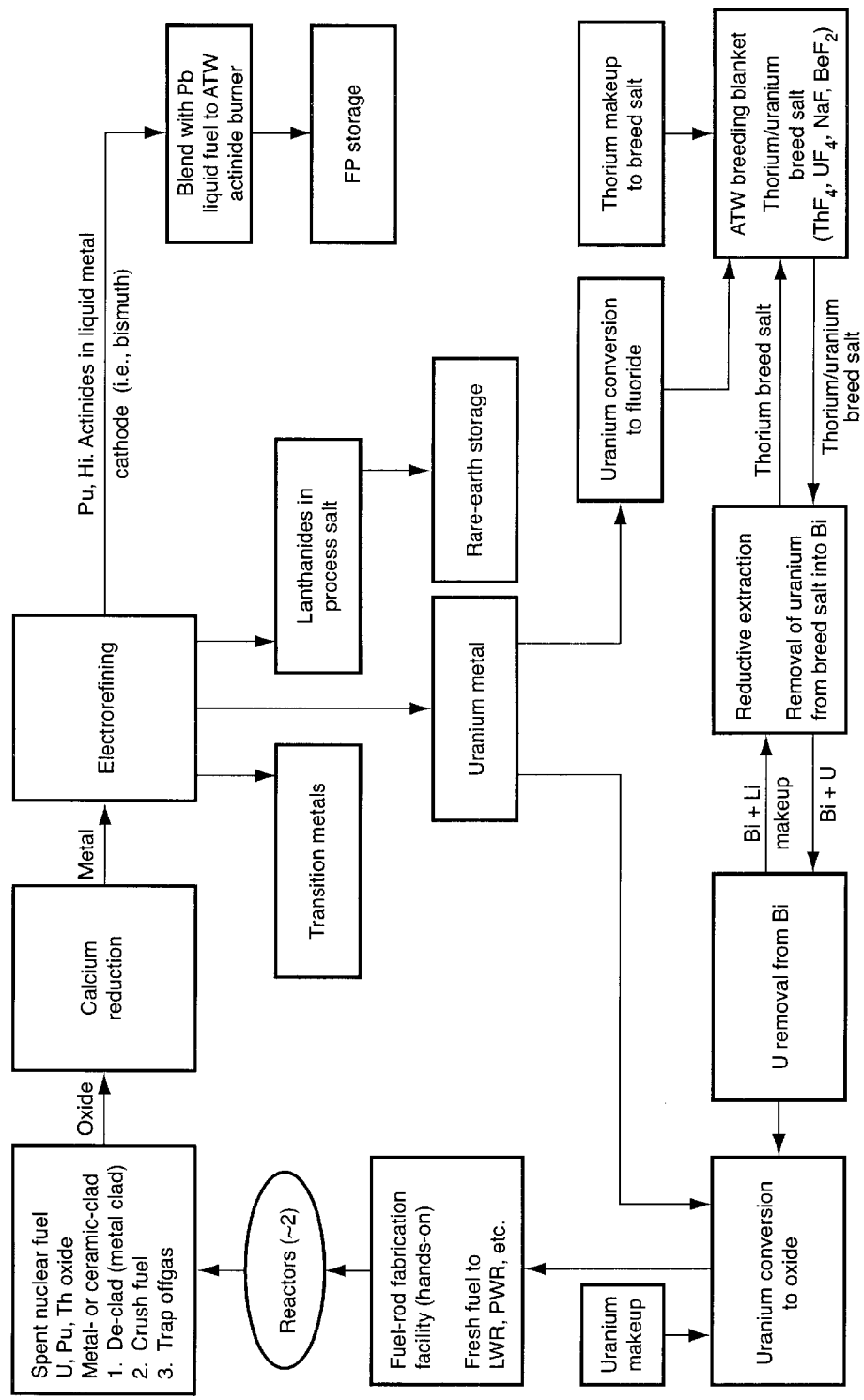
FIG. 13 is an expanded schematic illustration of the fuel preparation step shown in FIG. 12 hereof.
Figure 14:
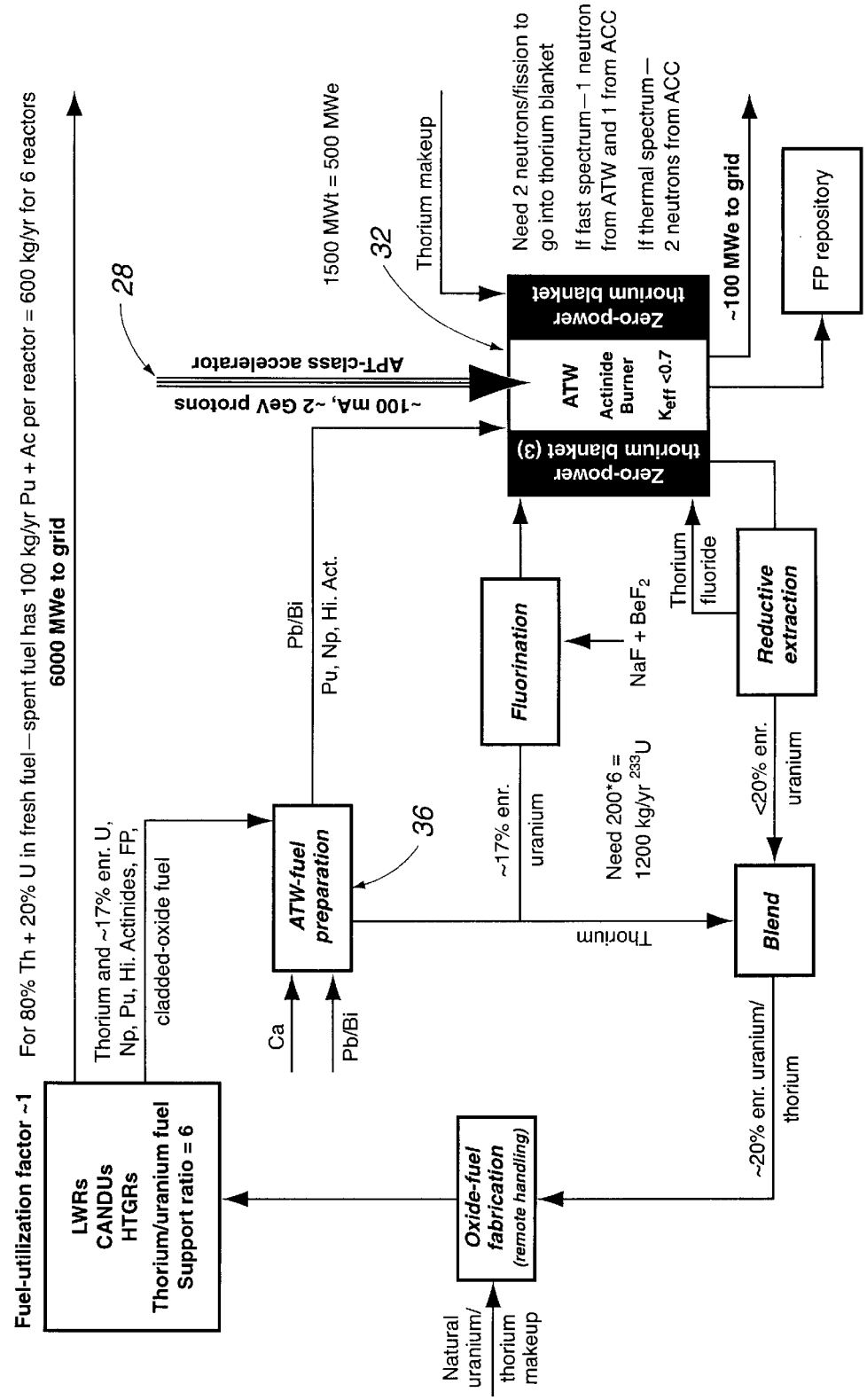
FIG. 14 is a schematic representation of the relationship among the process steps for the preparation of feed material and transmutation thereof, storage of the resulting materials, and preparation of new reactor fuel in accordance with the method of the present invention for the liquid metal/expanded use of nuclear power generation embodiment thereof.
Figure 15:
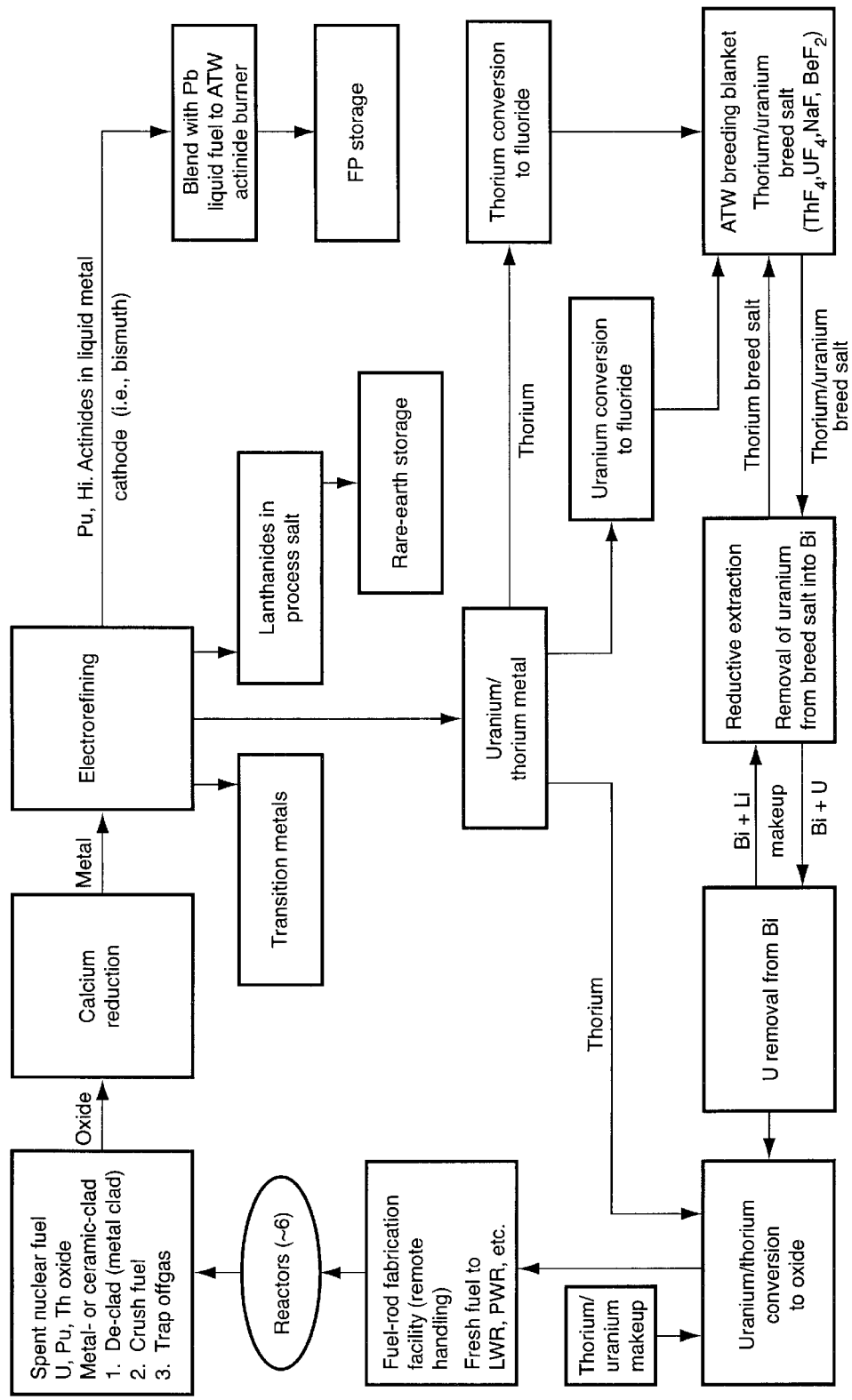
FIG. 15 is an expanded schematic illustration of the fuel preparation step shown in FIG. 14 hereof.
Figure 16:
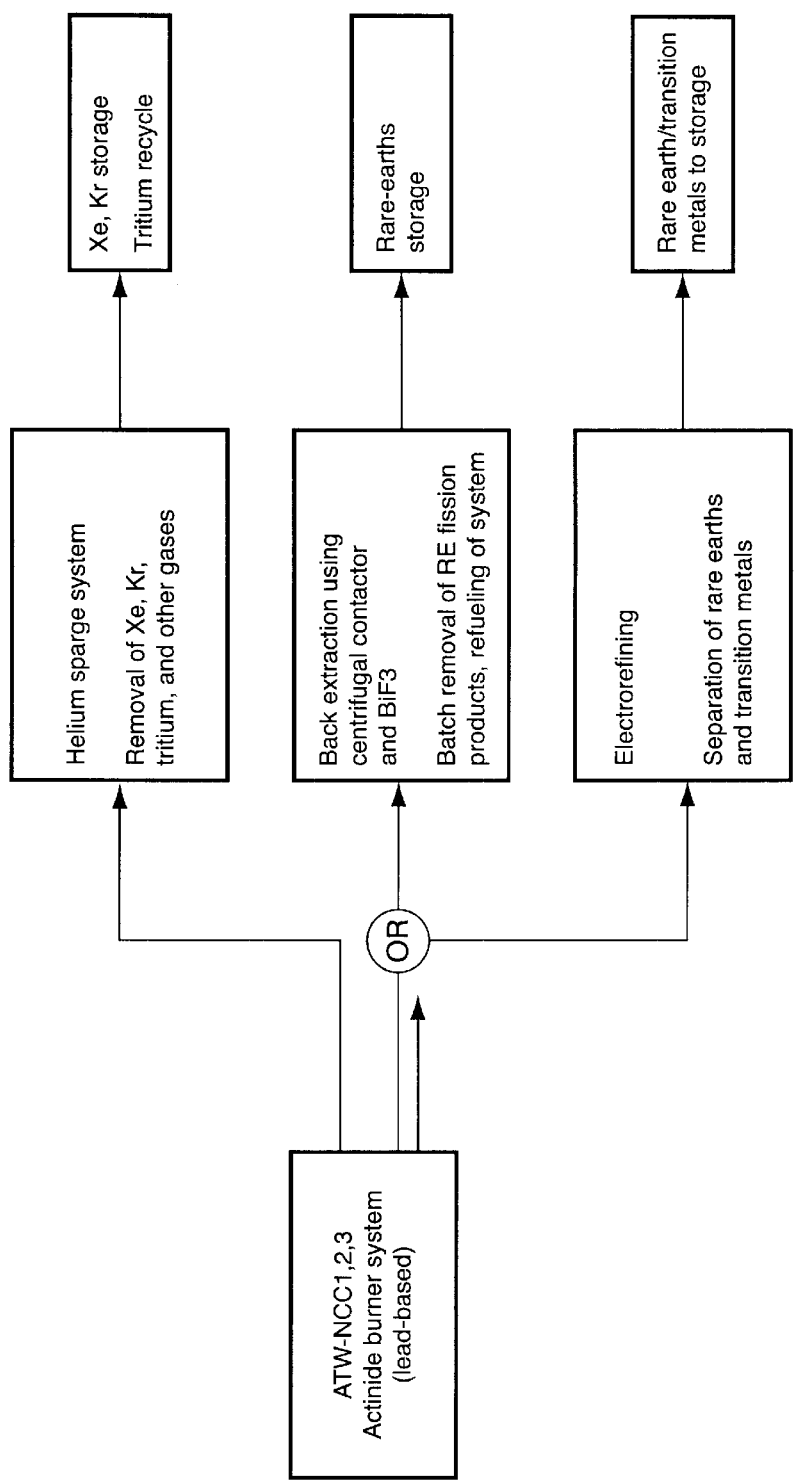
FIG. 16 is a schematic representation of steps for separation of the product materials resulting from transmutation of fission products according to the teachings of the present invention, as illustrated in FIGS. 10, 12 and 14 hereof, prior to storage.

FIG. 9 is a schematic representation of the top view of the cross section of the actinide and fission product transmutation apparatus, 32, for the liquid metal, fast neutron spectrum embodiment of the present invention. A liquid metal target, for example, lead or lead/bismuth, 22, is surrounded by a molten thorium fluoride breeding blanket containing ThF$_4$, NaF, BeF$_2$, and UF$_4$. Unlike FIG. 1, a graphite reflector might not be required. Plutonium and higher actinide metal fuels are dissolved in the liquid metal target which is exposed to a high current density of protons. FIG. 10 is a schematic representation of the steps for accomplishing the goals of the ATW-NCC1 liquid metal, fast neutron spectrum option of the present invention, where actinides and fission products are destroyed, but there is no fuel recycling. FIG. 11 is an expanded schematic representation of the fuel preparation step, 36, of FIG. 10. FIG. 12 is a schematic representation of the steps for accomplishing the goals of the ATW-NCC2 liquid metal, fast neutron spectrum option of the present invention, where actinides are destroyed and uranium fuel is recycled, while FIG. 13 is an expanded schematic representation of the fuel preparation step, 36, of FIG. 12. FIG. 14 is a schematic representation of the steps for accomplishing the goals of the ATW-NCC3 liquid metal, fast neutron spectrum option of the present invention, where actinides are destroyed and thorium/uranium fuel is recycled, while FIG. 15 is an expanded schematic representation of the fuel preparation step, 36, of FIG. 14. FIG. 16 is a schematic representation of the fission product removal steps from the liquid metal located in the actinide burner portion, 24, of the actinide and fission product transmutation apparatus, 32, for the ATW-NCC, fast neutron spectrum options 1, 2, and 3.

Having generally described the molten metal embodiment of the present invention, the following expands upon some of the principal processing steps. The three principal chemical processes associated with the ATW-NCC liquid lead fuel cycle are oxide reduction, electrorefining, and reductive extraction.

1. Oxide Reduction

Spent nuclear fuel is converted to fuel for the liquid-metal fueled system by a two-step process. After the spent fuel is decladded and crushed, the oxide powder is mixed into a $CaCl_2$ molten salt which contains calcium metal. The calcium metal reduces the spent fuel metal oxides and produces metals ( U, Pu, etc.). The calcium oxide that is produced is soluble in the calcium chloride. Calcium oxide dissolved in the calcium chloride can be converted to calcium chloride and the salt reused. The metals produced by the reduction process are then introduced to an electrorefining cell.

2. Electrorefining

The metals produced by the calcium reduction process serve as the anode in the electrorefining cell. The fluid within the cell is a NaCl/KCl eutectic molten salt with a small concentration of a weak metal chloride, perhaps bismuth chloride, which will oxidize a small quantity of the active metals. Two types of cathode materials are required. The first cathode is a bare metal rod or wire mesh attached to the rod and serves as a location for the thorium and uranium to deposit. The second cathode is liquid bismuth metal that will collect the transuranic elements as alloys. The deposition is controlled by an external power supply. The rare-earth elements remain in the molten salt and can be discarded. The transition metal elements remain at the anode and can be discarded. The bismuth - actinide alloys are blended with the liquid lead coolant/fuel carrier and directed to the transmutation apparatus. The uranium and thorium are recycled.

3. Reductive Extraction

Reductive extraction similar to the back extraction process employed in the molten salt system will be used to remove the rare-earths, strontium, and cesium fission products from the liquid-lead carrier. The equation that describes the process is $$3 M \text{ (I, in Pb—Bi)} + n \text{ BiCl}_3(d) = n \text{ BiCl (I, in Pb—Bi)} + 3 \text{ MCl}_n(d), \qquad (7)$$

where $MCl_n$ is a rare earth, strontium or cesium chloride of valence n dissolved in the NaCl/KCl eutectic molten salt and M is the metal dissolved in liquid metal carrier. The process is driven by the free energy difference between the metal chloride and the liquid metal alloys. The rare-earth strontium and cesium chlorides are more thermodynamically stable than the actinide chlorides and are preferentially extracted from the fuel salt. The degree of separation is governed by the concentration of bismuth chloride in the molten salt. The rare-earth fission products collected in the molten salt are oxidized and blended with silica and sent to a storage facility.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for processing spent fuel from nuclear reactors, which comprises the steps of:

a. dissolving the spent fuel in a molten salt, forming thereby a solution;

b. separating uranium and transition metals from the solution;

c. exposing the solution to an intense flux of thermal neutrons; and d. separating the transmutation products for storage thereof; whereby plutonium and higher actinides, and fission products are transmuted.

2. The method for processing spent fuel from nuclear reactors as described in claim 1, wherein thermal neutrons are generated by the action of a high-intensity proton beam on a spallation target, and subsequently moderated.

3. The method for processing spent fuel from nuclear reactors as described in claim 1, wherein the solution is surrounded by thorium, whereby $^{233}U$ is generated.

4. The method for processing spent fuel from nuclear reactors as described in claim 3, wherein the separated uranium is combined with the $^{233}U$ for generating enriched fuel.

* * * * *